H. A. W. WOOD.
PRINTED AND SLIP SHEET SEPARATING APPARATUS.
APPLICATION FILED OCT. 30, 1905.
1,090,437.
Patented Mar. 17, 1914.
12 SHEETS—SHEET 2.
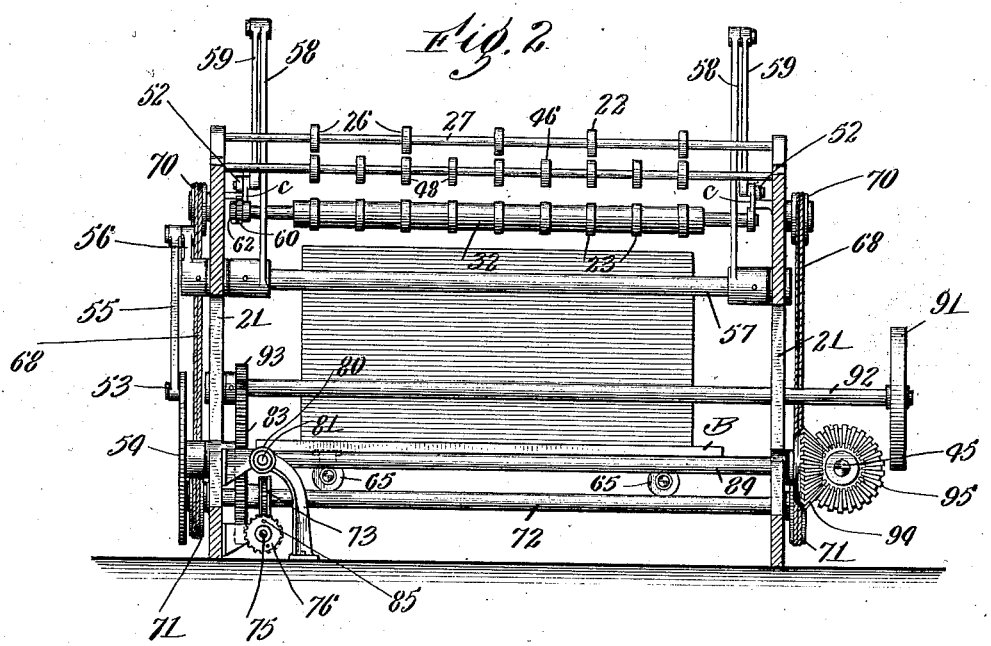
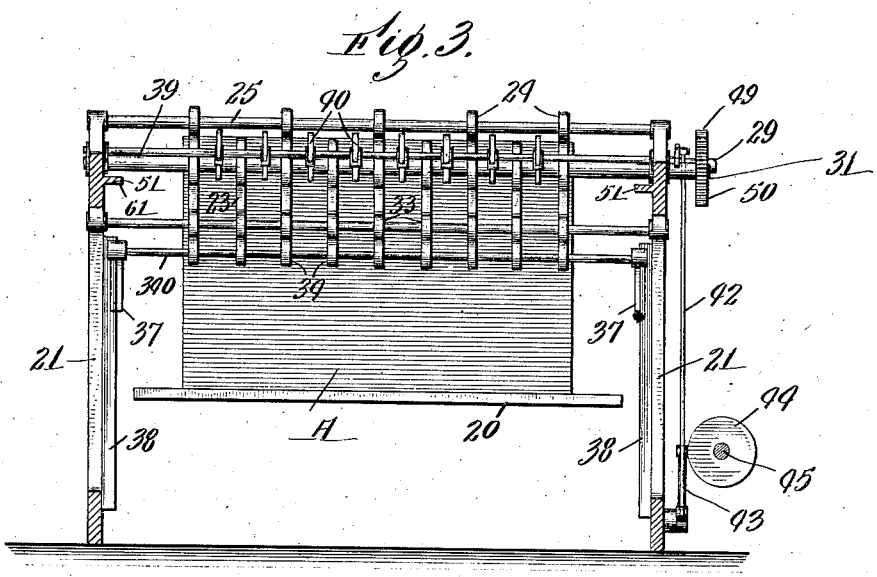
WITNESSES:
INVENTOR
H. A. Wise Wood
BY HIS ATTORNEYS

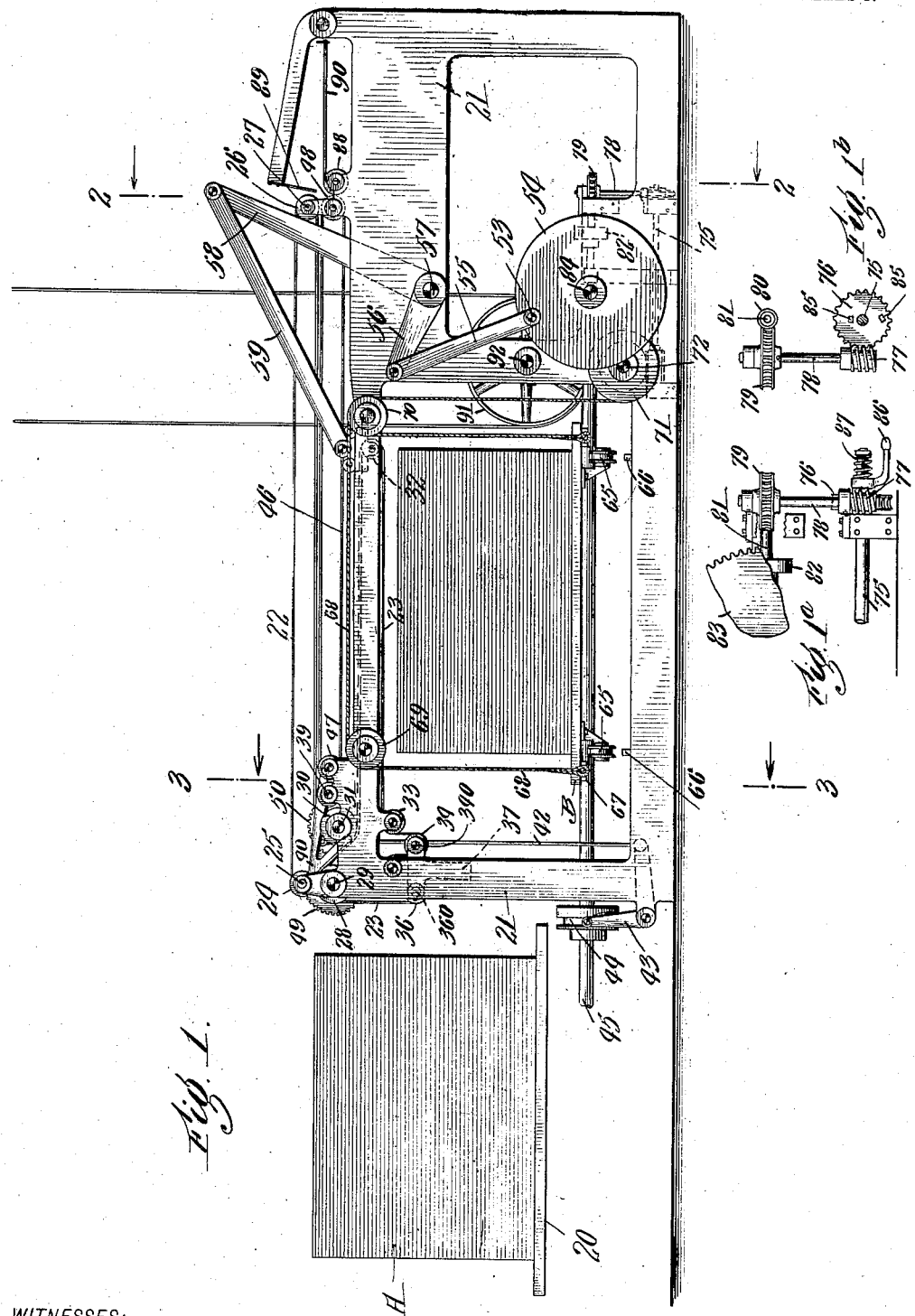

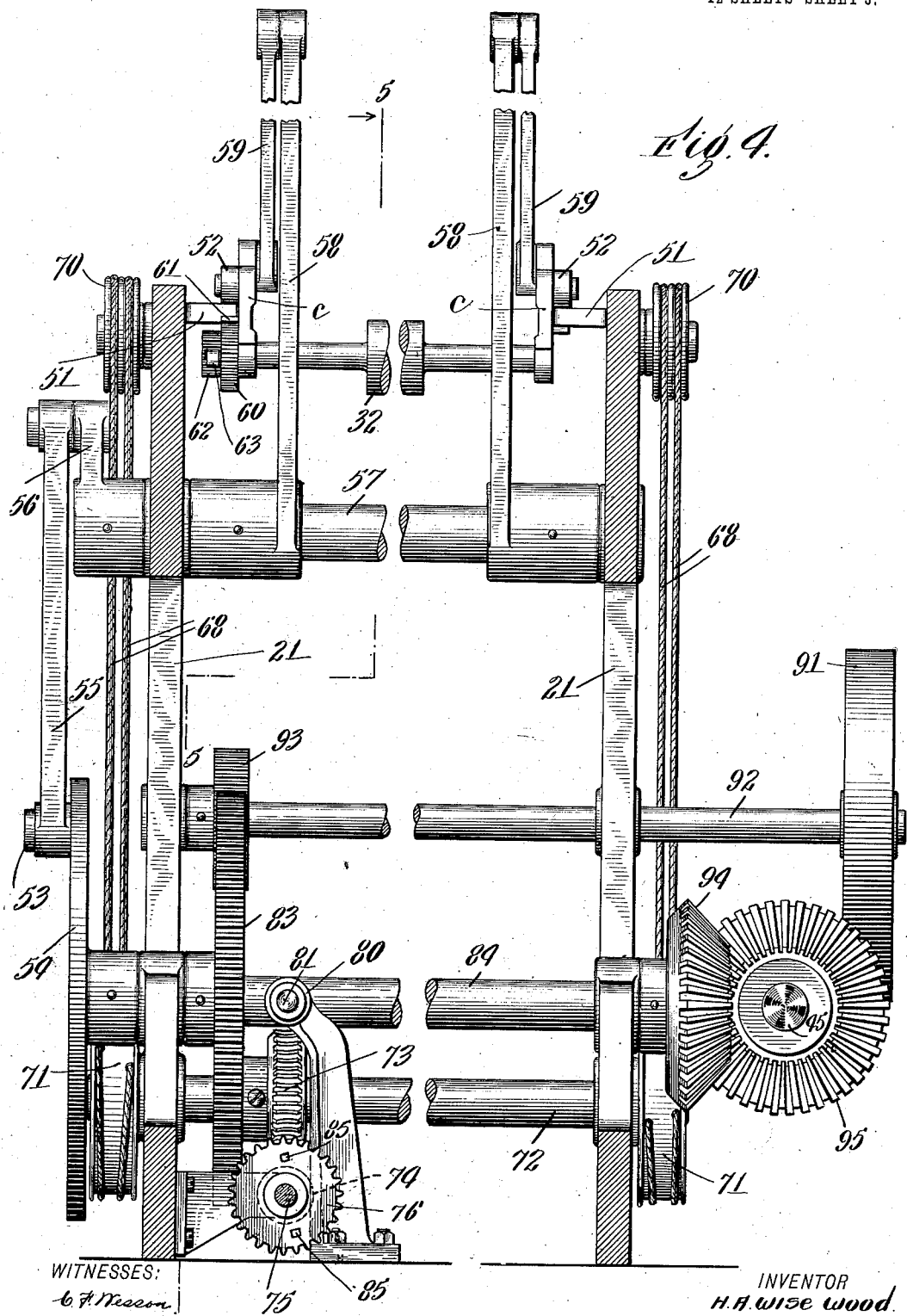

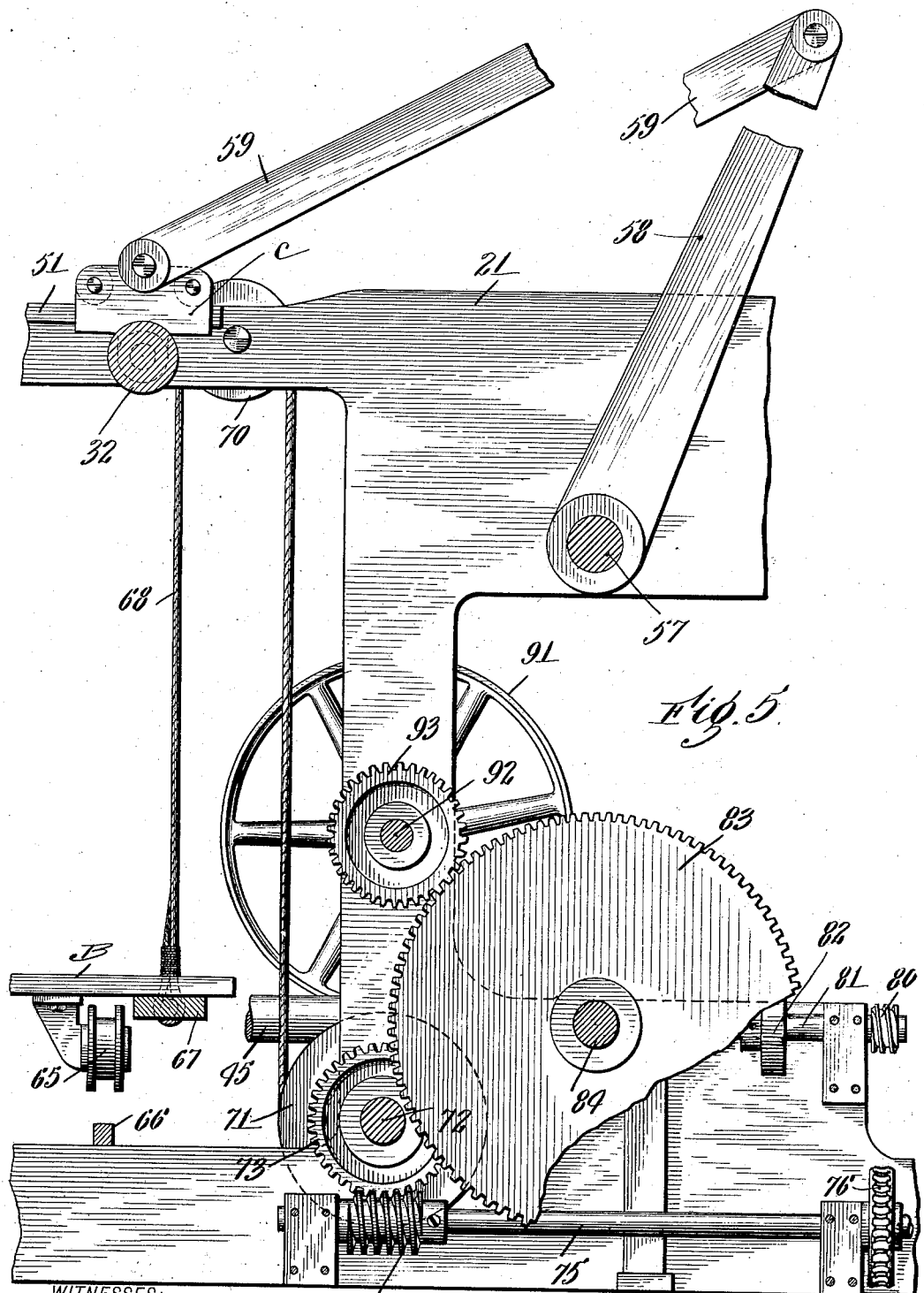

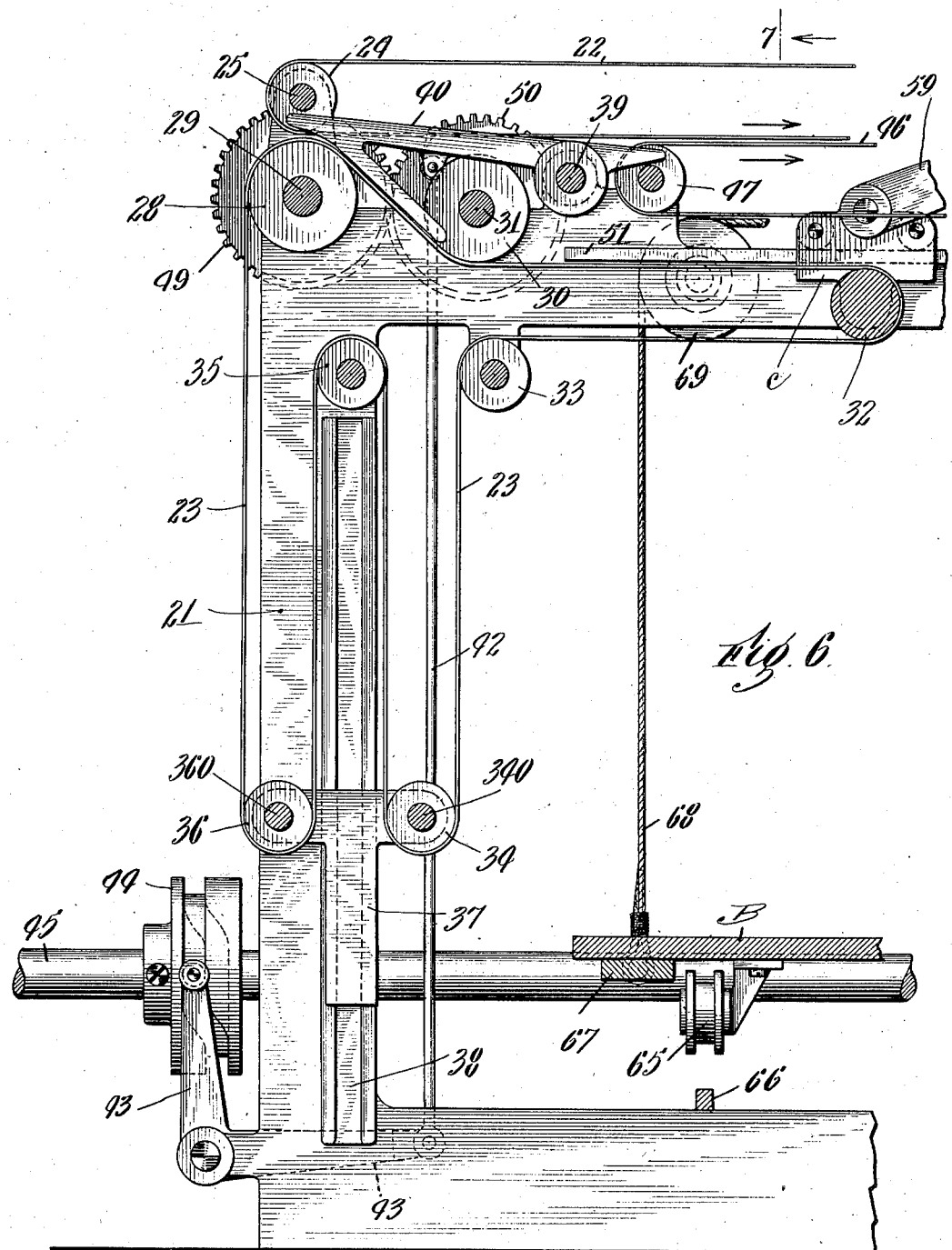

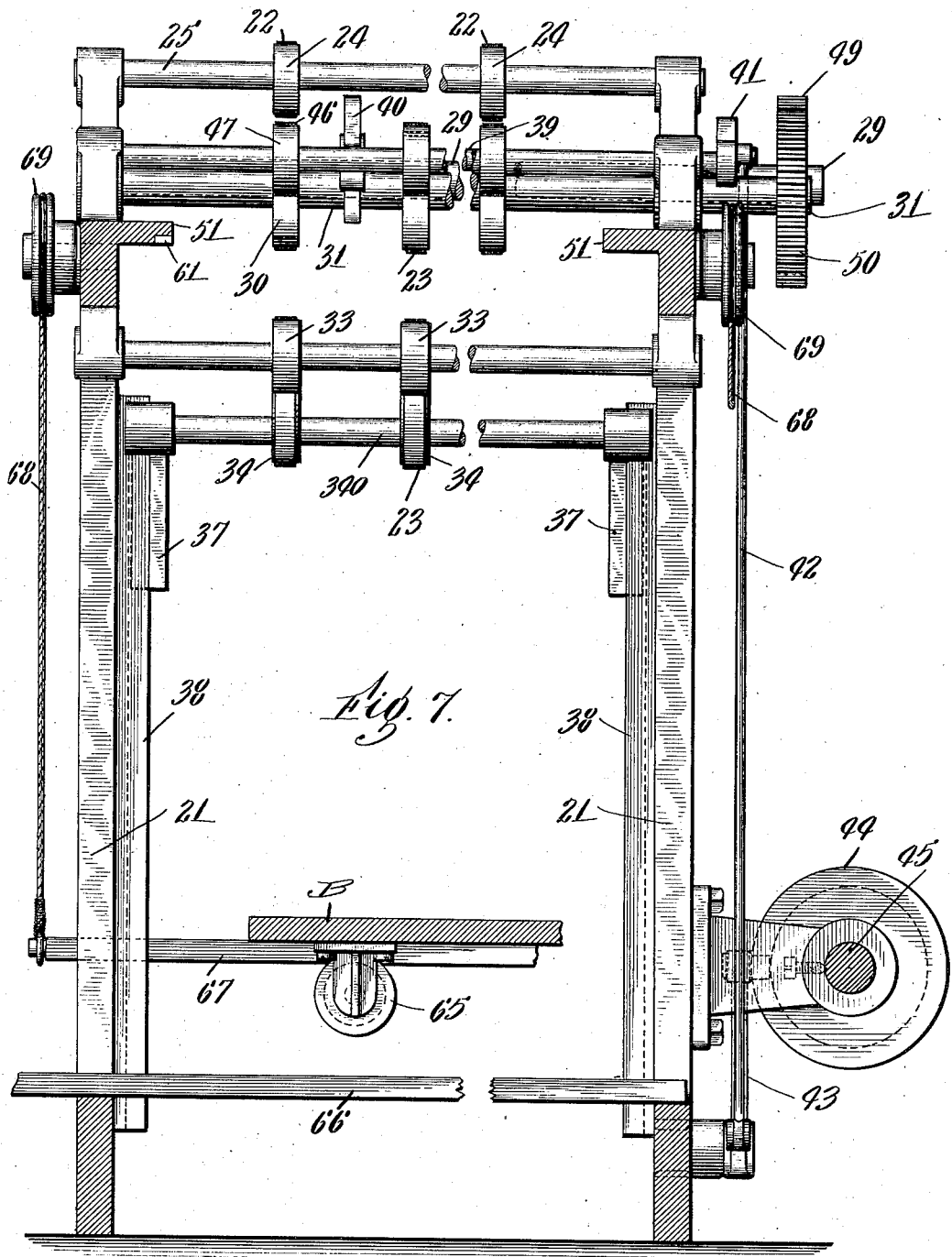

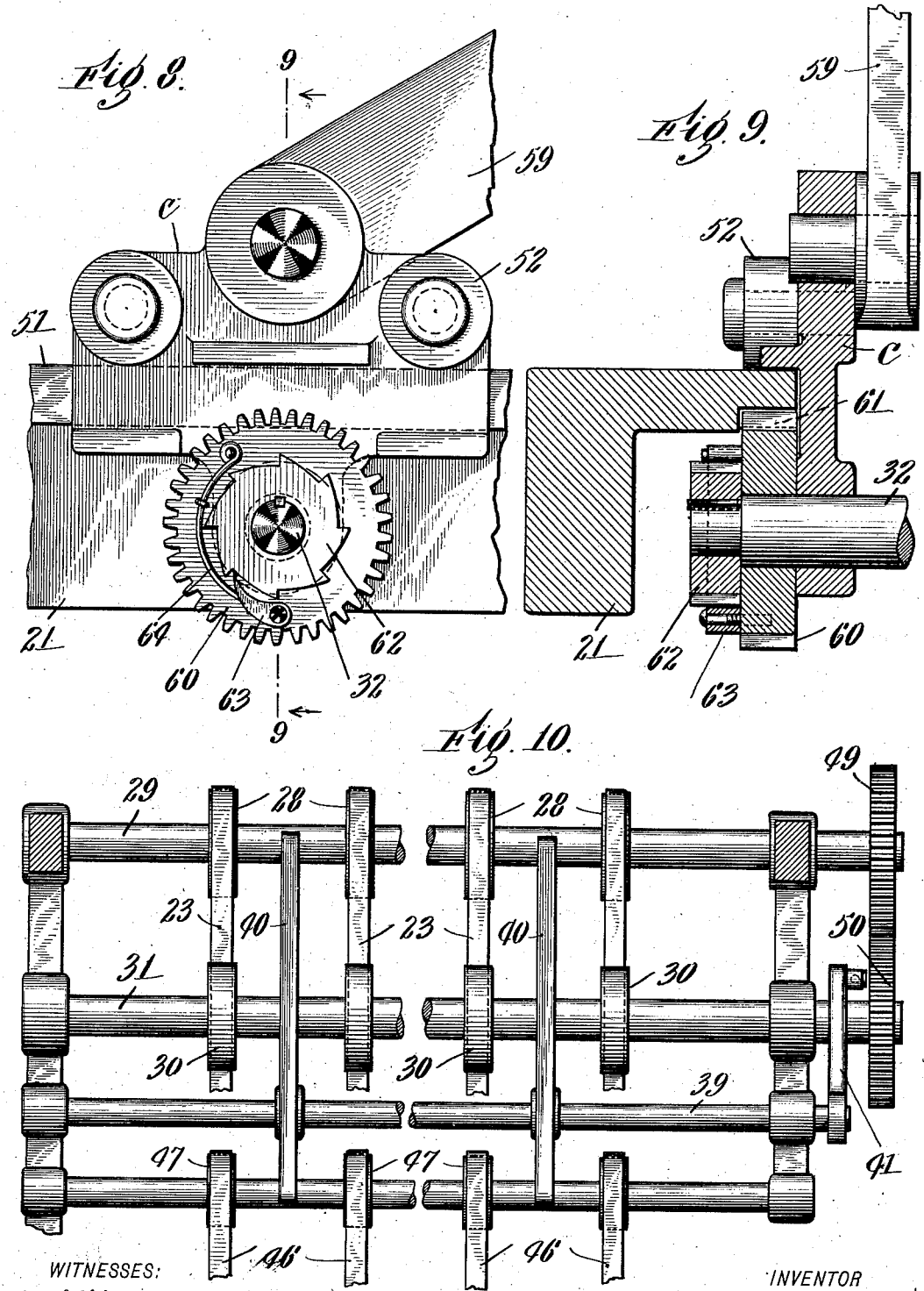

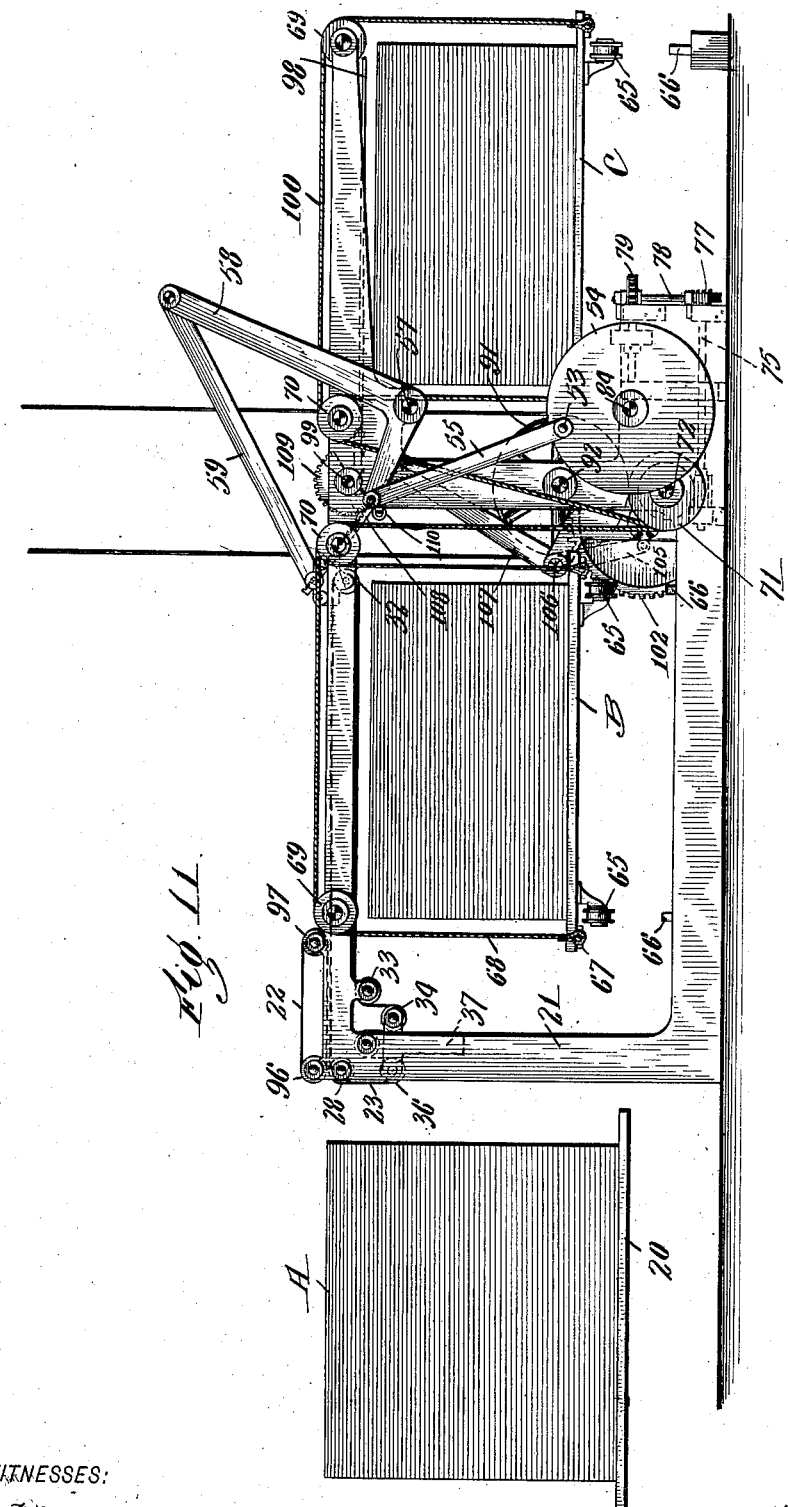

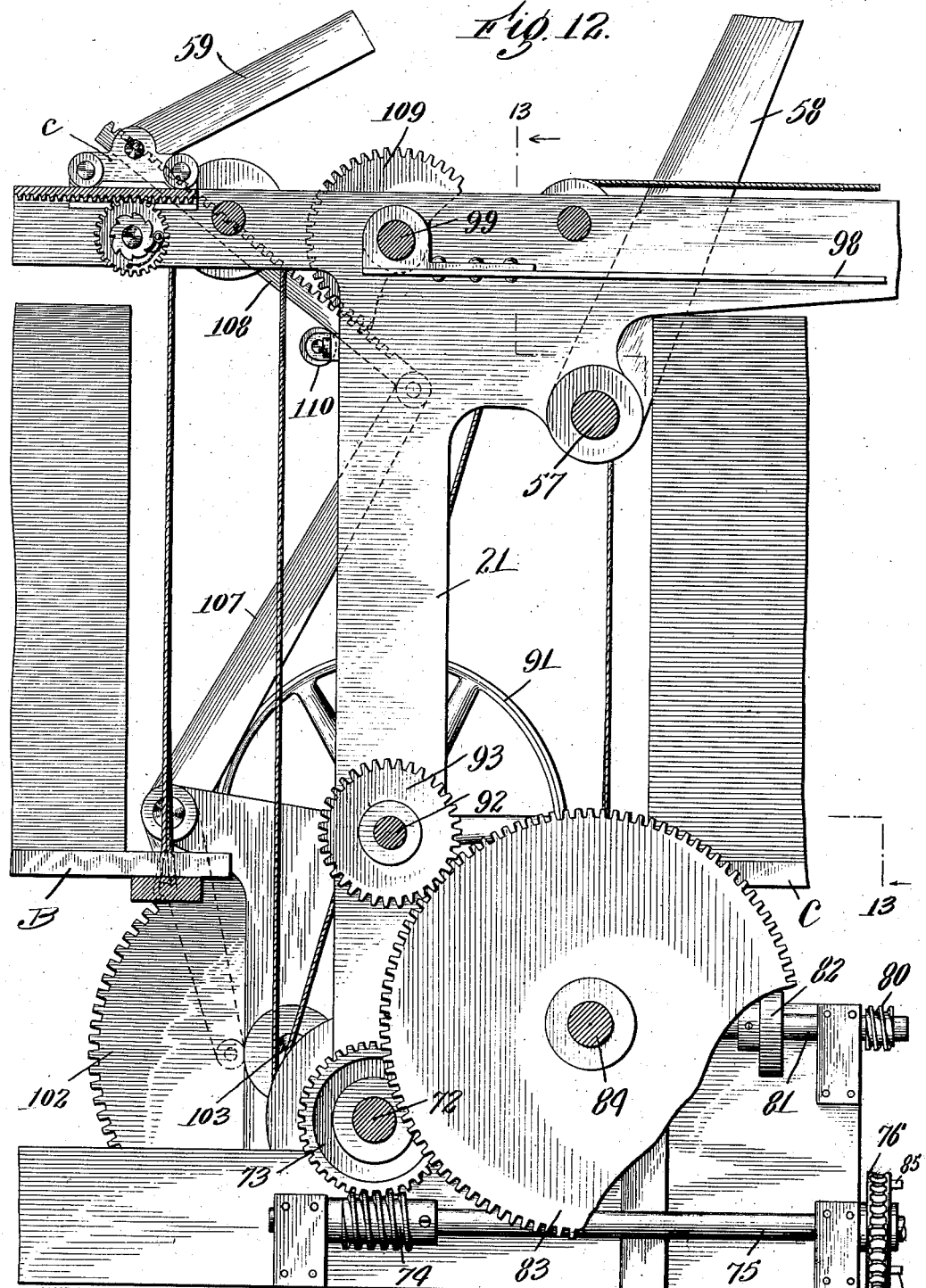

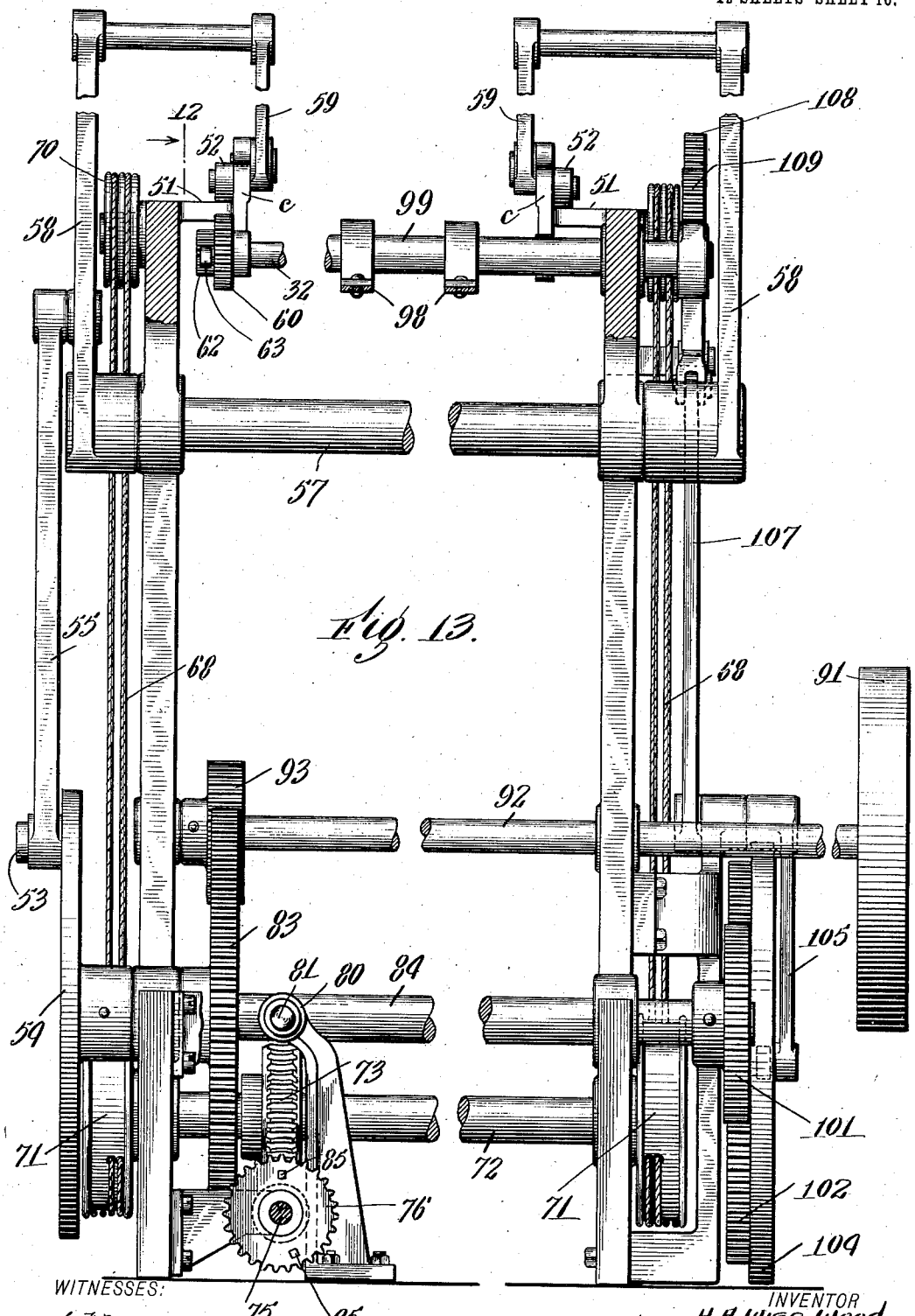

H. A. W. WOOD.
PRINTED AND SLIP SHEET SEPARATING APPARATUS.
APPLICATION FILED OCT. 30, 1905.
1,090,437.
Patented Mar. 17, 1914.
12 SHEETS—SHEET 11.
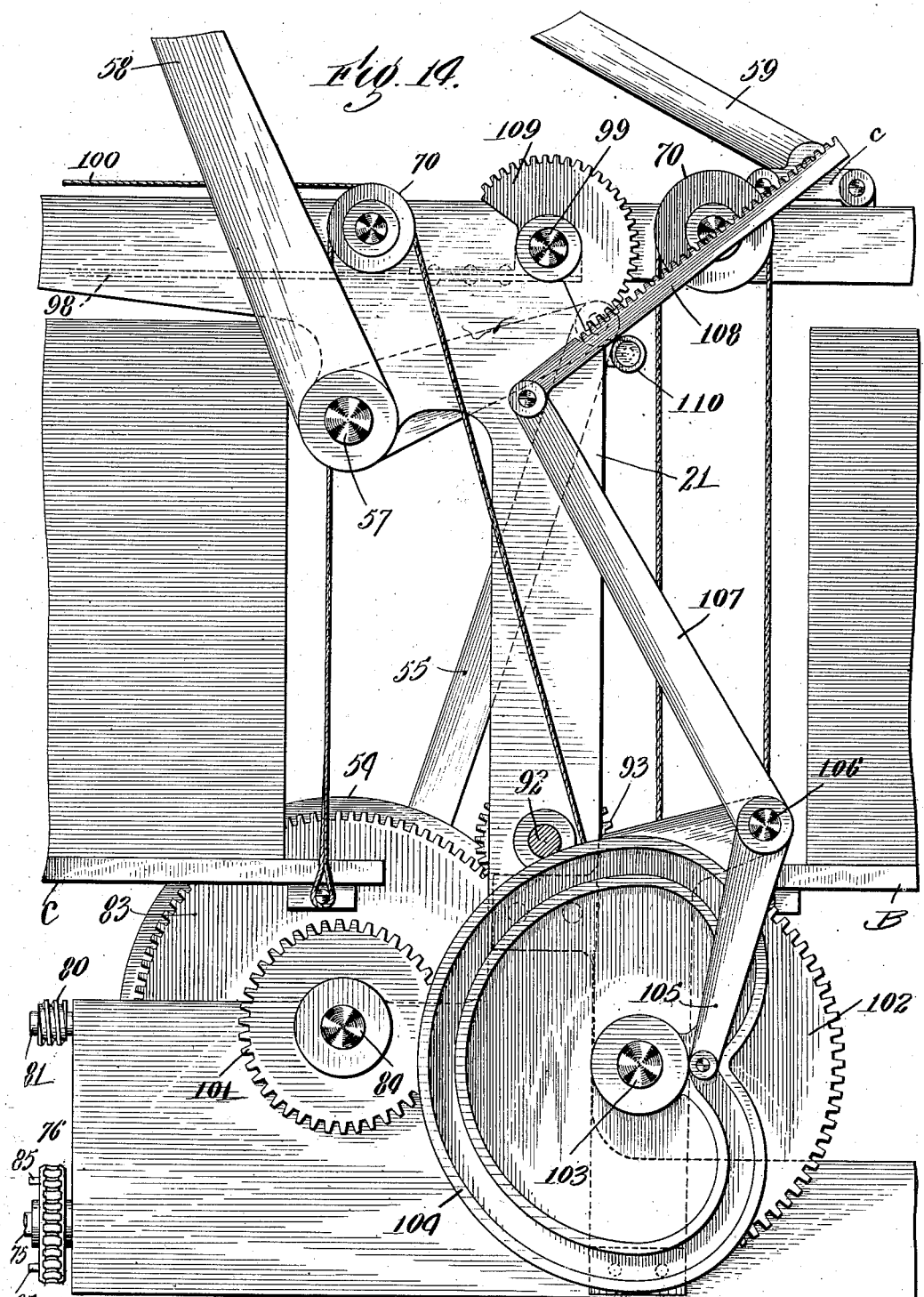

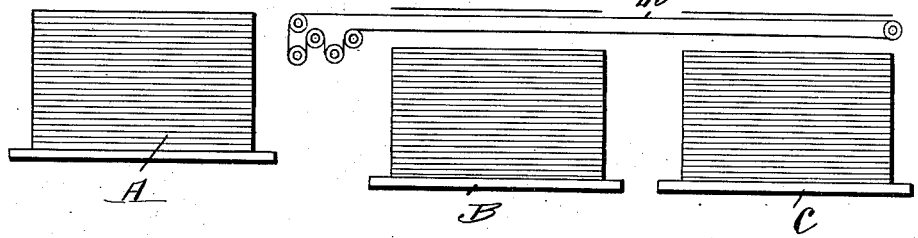
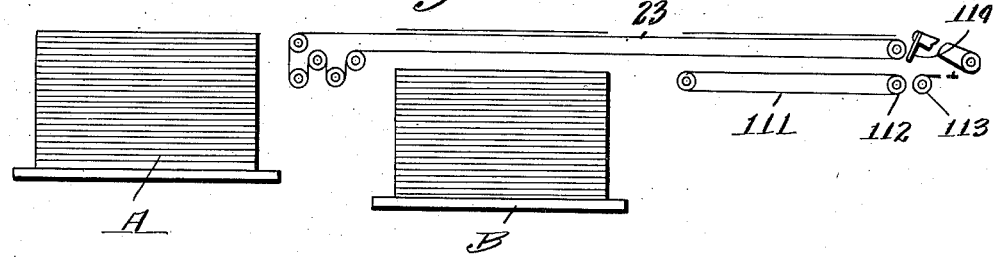
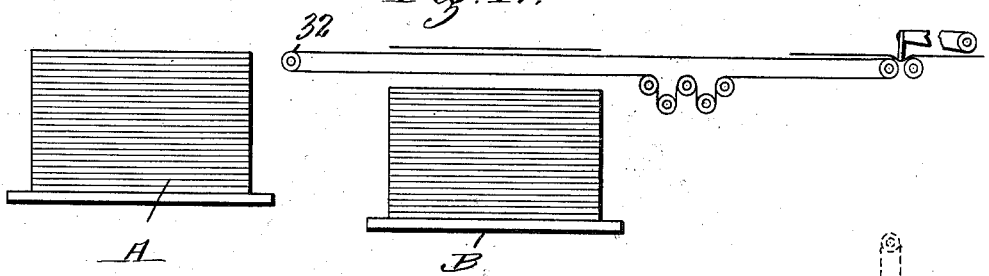
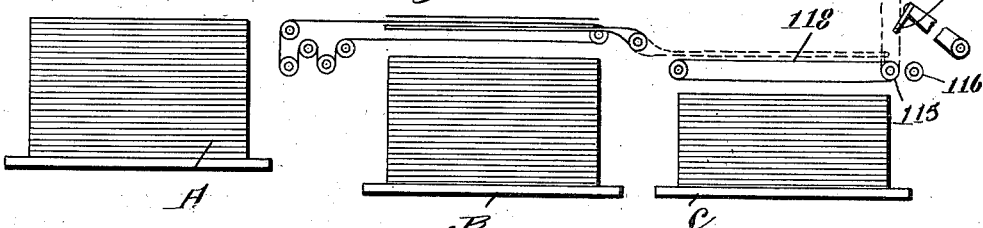

UNITED STATES PATENT OFFICE.

HENRY A. WISE WOOD, OF NEW YORK, N. Y., ASSIGNOR TO THE WOOD & NATHAN COMPANY, OF NEW YORK, N. Y., A CORPORATION OF NEW YORK.

PRINTED AND SLIP SHEET SEPARATING APPARATUS.

1,090,437.   Specification of Letters Patent.   Patented Mar. 17, 1914.

Application filed October 30, 1905. Serial No. 285,124.

*To all whom it may concern:*

Be it known that I, HENRY A. WISE WOOD, a citizen of the United States, residing at New York, in the county of New York and State of New York, have invented a new and useful Printed and Slip Sheet Separating Apparatus, of which the following is a specification.

The object of this invention is to provide an apparatus for separating printed and slip-sheets.

In many classes of printing, particularly the nicer classes, such as color-work, it is customary to interpose a blank sheet on top of each of the printed sheets as the same is delivered, these blank sheets being called "slip-sheets", and serving to keep the printed sheets from offsetting or smutting each other. Sometimes these slip-sheets are interposed by a hand-feeder between the printed sheets as they are delivered; or, in other cases, the slip-sheets are interposed by an apparatus designed for that purpose. However the slip-sheets are interposed, the delivered product is made up of a pile of sheets consisting alternately of a printed sheet and a slip-sheet. It is customary after the sheets have been delivered in this way to separate the sheets by hand, so that the printed sheets will be left in one pile and the slip-sheets in another. This is a laborious and slow operation and is one which adds greatly to the cost of using slip-sheets.

The object of this invention is to provide an apparatus by which a pile of sheets consisting of printed sheets and slip-sheets can be separated, and the printed sheets put in a flat pile or passed to a folder or other sheet-manipulating apparatus, and the slip-sheets deposited in a pile by themselves ready for use again.

I have shown in the accompanying twelve sheets of drawings various ways by which my invention can be practised.

Referring to the drawings and in detail, Figure 1 is a side elevation of the preferred form of my apparatus. Figs. 1ª and 1ᵇ illustrate a detail hereinafter described. Fig. 2 is a cross-sectional view taken on the line 2—2 of Fig. 1. Fig. 3 is a cross-sectional view taken on the line 3—3 of Fig. 1. Fig. 4 is a partial cross-sectional view similar to Fig. 2 taken on an enlarged scale to illustrate the details of the gearing. Fig. 5 is a partial sectional elevation taken on the line 5—5 of Fig. 4. Fig. 6 is a partial side elevation of the front end of the apparatus on an enlarged scale. Fig. 7 is a partial sectional view taken on the line 7—7 shown in Fig. 6 on the same enlarged scale. Fig. 8 is an enlarged detail of the ratchet mechanism employed in the delivery apparatus for the slip-sheets. Fig. 9 is a sectional elevation thereof on the line 9—9 of Fig. 8. Fig. 10 is a plan view showing the arrangement of tapes and switch. Fig. 11 is a view similar to Fig. 1 illustrating a modification. Fig. 12 is a side elevation on an enlarged scale of part of the apparatus shown in Fig. 11. Fig. 13 is a cross-sectional view taken on the line 13—13 of Fig. 12. Fig. 14 is a side elevation taken on the side opposite to the view shown in Fig. 12, and Figs. 15 to 18 inclusive, are diagrammatic views illustrating further modifications which may be made in the general arrangement of the apparatus.

Referring to the drawings and in detail, I will first describe the preferred form of my invention shown in the first seven sheets of the drawings, and in Figs. 1 to 10 inclusive, wherein an apparatus is shown whereby the slip-sheets are delivered in a pile, and the printed sheets are passed to a folding mechanism.

In said drawings A designates a pile of interposed printed and slip-sheets. This pile is laid upon a suitable table 20 and the sheets are fed one at a time from said pile either by any of the usual automatic feeders or by hand. The apparatus for manipulating the sheets thus fed is arranged between two side frames 21—21. The sheets as they are fed first pass in between two sets of tapes, an upper set 22 and a lower set 23. The upper set of tapes is trained around tape pulleys 24 mounted on a shaft 25, and around tape pulleys 26 mounted on a shaft 27. The shaft 27 is continuously driven by any suitable means, not necessary to show, so that the said tapes 22 will run continuously in the direction indicated by the arrows. The lower set of tapes 23 is trained around tape pulleys 28 mounted on a shaft 29, and then around tape pulleys 30 mounted on shaft 31. Then the tapes pass around a roller 32 journaled in carriers c—c, and then around pulleys 33—34—35 and 36 back to the pulleys 28. The pulleys 33 and 35 are arranged on shafts which are journaled in the side frames 21—21. The pulleys 34 and 36 are mounted on shafts 340 and 360 respectively, which are journaled in frames or weights 37 which are fitted to slide on ways 38 formed or secured to the side frames 21—21. By this arrangement, as the tape roller 32 is reciprocated by the means hereinafter described, a constant tension will be kept on the tapes 23. A shaft 39 is journaled in the side frames 21—21 and the same carries a series of switch or fly fingers 40 interposed between the tape-pulleys, as shown in Fig. 10. On the end of the shaft 39 is arranged a lever 41 which connects by link 42 to a pivoted bell-crank lever 43, which carries a roller which engages the groove of a cam 44 arranged on a shaft 45 which is journaled in brackets projecting from the rear side frame 21. This shaft 45 is geared to make one revolution for each sheet and slip-sheet manipulated. A third set of tapes 46 is trained around tape pulleys 47 and a folding roll 48, which set of tapes is driven by any suitable means so as to move in unison with the set of tapes 22. The shafts 29 and 31 are geared together by gears 49 and 50, which gears are given an intermittent rotation from any suitable part of the machine just as each sheet is fed in between the tapes 22 and 23. By this arrangement, assuming the first sheet to be a printed sheet, it will be directed by the switch fingers in between the tapes 22 and 46 so as to pass to the folding mechanism hereinafter referred to, and the following slip-sheet will be directed by the switch-fingers down onto the lower set of tapes 23, and this operation will be repeated for each following printed and slip-sheet.

The carriers c—c for the roller 32 are arranged so as to be capable of a reciprocating motion on ways 51—51 formed or secured to the side frames 21—21. These carriers c—c are provided with rollers 52 to run on said ways. The carriers are reciprocated by means of a crank-pin 53 mounted on a disk 54 which crank-pin connects by link 55 to a lever 56 mounted on a shaft 57 journaled in the side frames 21—21. Arms 58—58 are secured to said shaft 57, and each carrier c is connected by a link to one of said arms 58.

The disk 54 is geared as hereinafter described to turn once for each sheet and slip-sheet manipulated in the machine, and by this arrangement, the carriers c—c will be reciprocated once for each sheet and slip-sheet. The shaft of the roller 32 is loosely journaled in the carriers c—c, and loosely arranged on the shaft is a gear 60 which meshes with a rack 61 cut or formed on the underside of one of the ways, as shown in Figs. 8 and 9. A ratchet-wheel 62 is secured on the end of the shaft of the roller 32, and engaging the ratchet-wheel is a pawl 63 pivoted on the gear 60, which pawl is held in engagement with the ratchet-wheel by a spring 64. By this arrangement, as the roller 32 moves forward or to the right, as shown in Fig. 6, the roller 32 will not be turned as the pawl will run idly around the ratchet-wheel, but when the roller 32 is moved in the opposite direction, the same will be rotated by the mechanism described to peel the tapes 23 from under the slip-sheet to allow a delivery of the same. The roller 32 will deliver the slip-sheets upon a delivery table B. This delivery table is provided with wheels 65 which run on tracks 66 extending laterally of the mechanism. By this arangement, the delivery table can be slid in or withdrawn laterally of the machine.

The delivery table is provided with bars 67 which project from each corner. These bars are engaged by loops formed in the end of cables 68, there being two cables on each side of the machine. The longest cable at each side of the machine extends over a pulley 69, and the two cables at each side of the machine are trained over concentric pulleys 70—70, and are secured at their ends to a drum 71 arranged on the end of a shaft 72, there thus being two drums, one at each side of the machine. These drums are operated to lower the delivery table B as the pile of slip-sheets accumulates thereon by the following mechanism:—A worm-wheel 73 is secured on the shaft 72, and meshing with the same is a worm 74 secured on a shaft 75 journaled in brackets just inside the framing. The shaft 75 is driven by a worm-wheel 76 which is driven by a worm 77 arranged on a vertical shaft 78 which carries a worm-wheel 79, engaging which is a worm 80 secured on the end of a shaft 81. Adjustably secured on the shaft 81 is a friction disk 82 which bears on the side of a large gear 83 mounted on a shaft 84. By adjusting the friction disk on the shaft 81 the rate of descent of the table B can be adjusted. The worm-wheel 76 is loosely arranged on this shaft, and the same has suitable projections 85. A handle 86 is keyed on the end of the shaft 75, and is held normally in engagement with the projections 85 by a spring 87, whereby the worm 76 will normally drive the shaft 75, as shown in Figs. 1ª and 1ᵇ.

In operation, the delivery table is run on its rails in position in the machine, and the cables 68 are engaged therewith. The handle 86 is then pulled out so as to clear the projections 85, and the shaft 75 is turned to its highest position. Then the handle 86 is released so that the worm-wheel 76 will be locked to the shaft 75 and then as the machine operates, the delivery table B will be lowered as the pile of slip-sheets accumulates thereon, until it comes down to its rails, when it is slid laterally out of the machine to remove the slip-sheets. By this mechanism a large pile of slip-sheets can be delivered without stopping the machine, and the delivery of each sheet takes place accurately in the same position, owing to the automatic lowering of the delivery table. The adjustable friction disk provides for an adjustment so that this lowering of the delivery table can be timed accurately to the delivery of the slip-sheets. Coöperating with the folding roll 48 is a folding roller 88, a tucker-blade 89, and a set of guiding fingers 90. By this arrangement, the printed sheets as they come out between the tapes 22 and 46, will be folded down between the folding rolls 48 and 88, and from these rolls the sheets may be led to any suitable delivery mechanism or folder manipulating mechanism.

Power may be applied to the apparatus described by means of a driving belt passing around a driving pulley 91 arranged on a shaft 92 and carrying a pinion 93 meshing with the gear 83 previously referred to. The crank-disk 54 before referred to is arranged on the end of the shaft 84 which carries the large gear 83. On the other end of the shaft 84 is arranged a miter-gear 94 which meshes with a miter-gear 95 secured on the parallel shaft 45, whereby the remaining parts of the apparatus can be driven.

By the arrangement described, a pile of intermingled printed sheets and slip-sheets can be quickly separated from each other, the slip-sheets delivered in large piles ready for use again, and the printed sheets passed to a folder or other sheet manipulating mechanism.

In Figs. 11 to 14, inclusive, a modification is shown wherein the printed sheets can be delivered flat with either the last printed side up or down as desired. In these figures the parts referred to by the same reference letters or numerals used in Figs. 1 to 11, inclusive, are arranged and operate in the manner described in connection with the preferred modification. In this modification the upper set of tapes 22 is trained around tape pulleys 96 and 97. Intermingled with the lower set of tapes 23 is a set of fly-fingers 98 which are secured on a shaft 99 journaled in the framing. These fly-fingers are operated to take the sheet passing out on the tapes 23 and turn the same over and deliver the same on the delivery table C arranged substantially in the same manner as the delivery table B. In this modification the delivery table B is slid forward or toward the front for delivery and the table C is pushed in the opposite direction. The table C is lowered by supplemental cables 100 from the drums 71—71 in the same manner as the table B. In this modification, a pinion 101 is arranged on the rear end of the shaft 84, and the same meshes with and engages a gear 102 turning loosely on a stub shaft 103 and carrying a cam 104. Engaging the groove of this cam is a roller mounted on a pivoted lever 105 secured on the end of a short shaft 106 journaled in a bracket projecting from the framing. On the other end of the shaft 106 is arranged a lever 107 pivoted to the end of which is a rack 108 which engages a gear 109 secured on the end of the fly-finger shaft 99. The rack 108 is kept in engagement with the gear 109 by a roller 110. The reduction between the pinions 101 and 102 is two to one. It will be noted that the cam 104 is made concentric for about one-half of its periphery, and only has operative sections for the other half of its periphery.

The operation with this modification may be described as follows:—The first sheet passing between the tapes 22 and 23 is carried out over the delivery table B. Suppose the fly-fingers 98 are under the set of lower tapes 23 as this action takes place. Just as the pulley 32 reaches the end of its forward movement, and as this sheet reaches the end of its forward movement on said tapes 23, the fly-fingers will come into operation, and the sheet will be lifted by said fly-fingers, turned over, and delivered on the delivery table C. The fly-fingers, by reason of the construction of the cam described, will remain in delivery position as the next sheet passes into the apparatus. As this next sheet passes into the apparatus between the tapes 22 and 23, and as the same is advanced over the delivery table B, the fly-fingers will not be under the same. Therefore, during the backward or left-hand movement of the pulleys 32 this second sheet will be delivered on the table B. Thus the first sheet will be turned over and delivered on the table C, while the second sheet will be delivered on the table B without being turned over. Thus if it is desired to turn over and deliver the printed sheets, the feed is timed so that the printed sheets will be deposited upon the table C, and the slip-sheets on the table B; while on the other hand, if it is desired to deliver the printed sheets without turning the same over, the feed is timed so that the printed sheets will be delivered on the delivery table B and the slip-sheets on the table C.

This apparatus can be employed to great advantage when the sheets are printed upon one side at a time. In the first operation of separation from the slip-sheets, the printed sheets can be turned over so that they are ready to go back to the printing press again with their unprinted sides up. After the sheets have been perfected they may be separated from the slip-sheets with either side up as desired for the further manipulation of the sheets. This operation can well be carried out as it is practically immaterial which side up the slip-sheets are used, but if the above operation is carried out in connection with perfecting sheets, it will be noticed that the slip-sheets will be turned over once for every two separations from the printed sheets, which makes an advantageous way of using a pile of slip-sheets.

In Figs. 15 to 18, inclusive, diagrammatic views of other modifications are illustrated. In Fig. 15 the set of tapes 23 is arranged long enough so that two sheets following each other may be delivered upon the two delivery tables B and C, the set of tapes first carrying the sheets to position over said delivery tables and then retreating to deliver the sheets thereon. By arranging the apparatus in this way, the printed sheets and slip-sheets may be delivered in the same manner in two separate piles.

In the modification shown in Fig. 16, instead of using a delivery table C, the sheet delivered farthest from the feed table A is delivered upon a set of tapes 111 which run the sheet out over folding rollers 112 and 113 into the bite of which the sheet is tucked by a blade 114. In this way, by making the printed sheet the first to pass out upon the tapes 23, the printed sheets may be passed into a folder, and the slip-sheets delivered in a pile on the table B.

In the modification shown in Fig. 17, the roller 32 is arranged nearest the feed table A, and the take-up device for the delivery tapes is arranged between the delivery table B and the folder. In this arrangement, the first sheet passing out on the delivery table passes to the folder, and the second sheet passes over the delivery table B and is delivered thereon by a right-hand instead of a left-hand movement of the roller 32.

The modification shown in Fig. 18 is substantially the modification shown in Figs. 11 to 14, inclusive, except that a pair of folding rollers 115 and 116 are arranged beyond the delivery table C, and a tucker blade 117 is arranged to coöperate therewith. A swinging or folding apron 118 is arranged in connection with one of the folding rollers.

By this arrangement, by swinging the folding apron down in position so that the fly will deliver the sheets thereon, the printed sheets may be passed to the folder, or by turning the folding apron up as shown in dotted lines, the printed or slip-sheets may be delivered on the table C. This is an advantageous arrangement when it is desired to finally fold the printed sheets after they have been perfected.

Many other modifications may be worked out without departing from the scope of my invention as expressed in the claims.

Having thus fully described my invention, what I claim and desire to secure by Letters-Patent is:—

1. In an apparatus for separating intermingled printed and slip-sheets arranged alternately in a single pile, the combination of means for feeding sheets of this alternating character, means whereby every alternate sheet will be separated from the other sheets and delivered, a delivery table for receiving them, and means whereby said other sheets will be delivered.

2. An apparatus for separating intermingled printed and slip-sheets arranged alternately in a single pile, comprising means for advancing sheets from the pile, a sheet delivery mechanism, and means whereby every alternate sheet passing into the apparatus will be directed thereto and the remainder will be delivered from the machine.

3. An apparatus for separating intermingled printed and slip-sheets arranged alternately in a single pile, comprising means for advancing sheets from the pile, a sheet delivery mechanism, and means whereby every alternate sheet passing into the apparatus will be directed thereto.

4. An apparatus for separating intermingled printed and slip-sheets arranged alternately in a single pile, comprising means for advancing sheets from the pile, a sheet delivery mechanism, means for directing every alternate sheet thereto, and a sheet manipulating mechanism to which the sheets which do not pass to the delivery apparatus are directed.

5. In an apparatus for separating intermingled printed and slip-sheets, the combination with means for advancing the sheet, a sheet delivery mechanism, a sheet manipulating mechanism, a switch, and means for operating the switch to direct every alternate sheet to the sheet delivery mechanism, and the rest of the sheets to the sheet manipulating mechanism.

6. An apparatus for separating intermingled printed and slip-sheets, comprising means for advancing sheets, a sheet delivery mechanism, a folding mechanism, and means for directing every alternate sheet to the delivery mechanism, and the remaining sheets to the folding mechanism.

7. An apparatus for separating intermingled printed and slip-sheets, comprising means for advancing sheets, a reciprocating delivery mechanism, and means for directing every alternate sheet thereto.

8. An apparatus for separating intermingled printed and slip-sheets, comprising means for advancing sheets, a sheet delivery mechanism, means for directing every alternate sheet thereto, a delivery table, and means for automatically lowering the delivery table as the sheets accumulate thereon.

9. An apparatus for separating intermingled printed and slip-sheets, comprising means for advancing sheets, a sheet delivery mechanism, means for directing every alternate sheet thereto, a delivery table, means for automatically lowering the delivery table as the sheets accumulate thereon, and means for adjusting the rate of descent of the delivery table.

10. A sheet delivery mechanism comprising a set of tapes, a roller around which the same are led, means for reciprocating the roller, rollers or pulleys around which said tapes are looped, and counter-weights or frames for taking up the loops.

11. The combination of a reciprocating delivery, tracks passing thereunder, a delivery table having rollers whereby it may be slid under said delivery on the tracks, cables for supporting the delivery table above the tracks, and means whereby said delivery cables are raised and held in operative position and automatically and positively lowered toward the tracks as the pile of delivery sheets accumulates on the table.

12. In an apparatus for separating intermingled printed and slip sheets, the combination of means for moving the sheets one at a time along a path, means for delivering certain of said sheets, and means for automatically intercepting a sheet at regular intervals, preventing it from passing to said delivering means, and delivering it in a different place.

In testimony whereof I have hereunto set my hand, in the presence of two subscribing witnesses.

H. A. WISE WOOD.

Witnesses:
ANNIE B. WALTERS,
W. K. STETSON.